(12) United States Patent
Jeutter et al.

(10) Patent No.: US 7,669,326 B2
(45) Date of Patent: Mar. 2, 2010

(54) WORKPIECE WITH A RECESS WHICH IS CLOSED FROM THE EXTERIOR BY MEANS OF A SOLDER FILM AND METHOD FOR CLOSING A RECESS BY MEANS OF A SOLDER FILM

(75) Inventors: Andre Jeutter, Grafenau (DE); Silke Settegast, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1491 days.

(21) Appl. No.: 10/497,277

(22) PCT Filed: Dec. 18, 2002

(86) PCT No.: PCT/EP02/14501

§ 371 (c)(1),
(2), (4) Date: May 27, 2004

(87) PCT Pub. No.: WO03/053622

PCT Pub. Date: Jul. 3, 2003

(65) Prior Publication Data

US 2005/0076501 A1  Apr. 14, 2005

(30) Foreign Application Priority Data

Dec. 21, 2001  (EP) .................. 01130728

(51) Int. Cl.
*B23P 6/00* (2006.01)
*B63H 1/26* (2006.01)

(52) U.S. Cl. ...................... 29/889.1; 416/224

(58) Field of Classification Search ............... 29/889.1, 29/889, 889.21, 889.22, 889.72, 889.721, 29/889.722, 428, 525.14, 530; 415/115; 428/680; 228/122.1, 56.3, 194, 245
See application file for complete search history.

(56) References Cited

U.S. PATENT DOCUMENTS

| | | | |
|---|---|---|---|
| 3,843,333 A | | 10/1974 | Woods |
| 3,934,322 A | | 1/1976 | Hauser et al. |
| 4,098,450 A | | 7/1978 | Keller et al. |
| 4,169,726 A | * | 10/1979 | Fairbanks .................. 428/680 |
| 4,396,349 A | | 8/1983 | Hueber |
| 5,400,946 A | * | 3/1995 | Weise et al. .............. 228/122.1 |
| 5,557,837 A | | 9/1996 | Thiard-Laforet et al. |
| 5,951,792 A | | 9/1999 | Balbach et al. |
| 5,968,299 A | | 10/1999 | Meier et al. |
| 6,435,813 B1 | * | 8/2002 | Rieck et al. ................. 415/115 |
| 6,520,401 B1 | * | 2/2003 | Miglietti ..................... 228/194 |
| 2004/0060962 A1 | * | 4/2004 | Jacobson ................... 228/56.3 |

FOREIGN PATENT DOCUMENTS

AT  EP230082  *  7/1987

(Continued)

*Primary Examiner*—John C Hong

(57) ABSTRACT

It is known from the prior art that holes in a workpiece are filled completely with a solder powder, which leads especially in the case of large holes to the formation of cracks within the solder due to the large volume filled in once the solder cools off after soldering. The invention provides a method for closing a recess of a workpiece, which allows closing an opening of a recess without the risk of crack formation, by using only a solder film for closing the recess. The solder film has a content of non-melting material and therefore is substantially less prone to form cracks.

11 Claims, 2 Drawing Sheets

FOREIGN PATENT DOCUMENTS

| | | |
|---|---|---|
| DE | 903 405 | 5/1953 |
| DE | 195 02 308 A1 | 8/1996 |
| EP | 0144998 * | 6/1985 |
| EP | 0164906 * | 12/1985 |
| EP | 0 856 375 A1 | 8/1998 |
| EP | 1 154 124 A1 | 11/2001 |
| JP | 5680384 * | 7/1981 |
| JP | 58-044962 | 3/1983 |
| JP | 11-123617 | 5/1999 |
| WO | WO 00/27570 A1 | 5/2000 |

* cited by examiner

RT

HT

WORKPIECE WITH A RECESS WHICH IS CLOSED FROM THE EXTERIOR BY MEANS OF A SOLDER FILM AND METHOD FOR CLOSING A RECESS BY MEANS OF A SOLDER FILM

CROSS REFERENCE TO RELATED APPLICATIONS

This application is the US National Stage of International Application No. PCT/EP02/14501, filed Dec. 18, 2002 and claims the benefit thereof. The International Application claims the benefits of European application No. 01130728.7 filed Dec. 21, 2001, both of the applications are incorporated by reference herein in their entirety.

FIELD OF INVENTION

The present invention relates to a workpiece in accordance with the preamble of claim 1 and to a method for closing a recess.

BACKGROUND OF INVENTION

Soldering foils are used, for example, to cohesively join components, as is known from U.S. Pat. No. 5,557,837. In this case, the soldering foil, which consists of a soldering material whose melting point is significantly below the melting point of the components to be joined to one another, is melted and joins a non-melting insert part which is fitted into a recess in another component.

It is also known to fill cracks or openings with solder powder, with the solder powder being piled up above the crack or opening and being melted by the supply of heat so that it runs into the crack or opening, as is known, for example, from U.S. Pat. No. 4,098,450. In particular if large recesses are to be filled, the shrinkage involved in solidification often gives rise to cracks during cooling of the solder. The solder may undesirably penetrate into the interior of hollow bodies (e.g. a hollow turbine blade or vane) which are provided with a hole which is to be closed up.

It is also known to use soldering foils to coat materials, for example from U.S. Pat. No. 5,968,299.

In particular in the case of castings, such as for example turbine blades or vanes (cast, directionally solidified, single-crystalline), for manufacturing reasons there are in many cases blind bores or through-holes which need to be closed up since, for example, cooling air would otherwise escape in an undesired way from the interior of the turbine blade or vane through these holes, which reduces the efficiency of the turbine.

SUMMARY OF INVENTION

It is an object of the invention to develop a workpiece of the generic type in such a way that its recesses have crack-free closures, and to provide a method for closing up recesses in a workpiece which can be carried out in a simple way.

The invention provides for the workpiece to have a soldering foil which covers the respective opening of the recess and, at least in the edge region of the recess, is soldered to the base body at a surface of the workpiece. In this context, it is important that the soldering surface only partially comprises solder material in order to avoid cracks during the solidification which follows the soldering.

The recess may be a blind bore or a through-hole, so that various types of recesses are advantageously closed off by the soldering foil.

The workpiece may advantageously be a turbine blade or vane for use in the high-temperature region of a turbine or gas turbine in a cohesive and erosive environment.

The composition of the soldering foil comprising base material and solder is adapted to the workpiece and the operating conditions envisaged and/or the size of the recess, so that the recess also remains closed throughout the duration of use of the workpiece.

The soldering foil may advantageously be up to four millimeters thick, so that sufficient mechanical stability is ensured and even large holes are closed off in a sealed manner by the soldering foil.

If the supply of heat for closing off the recess, i.e. for melting the solder material, is provided during a heat treatment of the workpiece, in particular during a precipitation hardening or solution annealing of the workpiece, there is no need for a separate method step to join soldering foil and workpiece.

BRIEF DESCRIPTION OF THE DRAWINGS

A plurality of exemplary embodiments of the workpiece according to the invention and/or the method according to the invention are illustrated in the figures and are explained in more detail below together with further details of the invention.

In the drawing.

DETAILED DESCRIPTION OF INVENTION

Figure 1A:
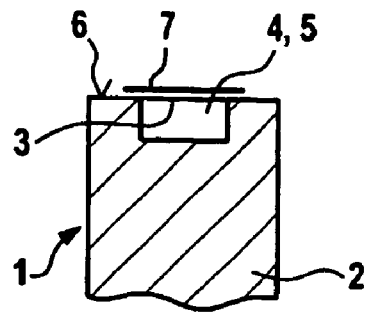
FIGS. 1a, b, c show two exemplary embodiments of a workpiece according to the invention.

FIG. 1a shows a workpiece 1 comprising a base body 2 which has at least one recess 4, for example a blind bore 5.

A soldering foil 7 is laid over this blind hole 5 on a surface 6 of the workpiece 1. The soldering foil 7 is soldered onto the surface 6 by a subsequent treatment at elevated temperatures, so that there is a cohesive closed join between soldering foil 7 and workpiece 1 or base body 2.

Figure 1B:
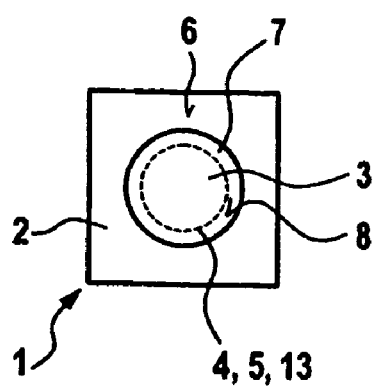

FIG. 1b shows a plan view of the recess 4, 5 shown in FIG. 1a with the soldering foil 7 applied to it.

The opening cross section or an opening 3 in the blind bore 5 is indicated by dashed lines. The outer contour of the soldering foil 7 is matched to the opening cross section of the blind bore 4 and at least partially projects beyond the opening cross section of the blind bore 5, so that it at least partially rests on the surface 6 in a bearing region 8. In this bearing region 8, there is a good join between soldering foil 7 and workpiece 1 after a soldering operation.

Figure 1C:
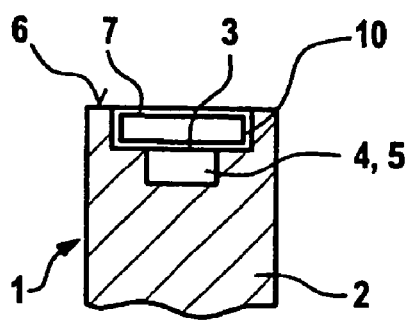

FIG. 1c, proceeding from FIG. 1a, shows a further exemplary embodiment, in which the blind bore 5 has, for example, a stepped cross-sectional widening 10, in the region close to the surface, introduced while the blind bore was being produced or subsequently. The soldering foil 7 is laid in a closely fitting manner into this cross-sectional widening 10, so that the soldering foil 7 at least partially rests on the base of the, for example, annularly encircling depression created in this way and consequently a smooth surface 6 is restored after the soldering operation. The soldering foil 7, which is of thin design and therefore includes much less material than a plug which fills the recess 4, 5, has little tendency to form cracks during cooling, i.e. during shrinkage.

Figure 2:
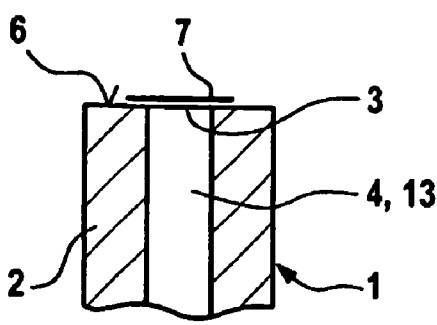
FIG. 2 shows a further exemplary embodiment of a workpiece according to the invention.

FIG. 2 shows a further exemplary embodiment of a workpiece according to the invention. Unlike in FIG. 1a, the workpiece 1 does not include a blind bore, but rather has a through hole 13, the opening 3 of which is closed off by the soldering foil 7.

Figure 3A:
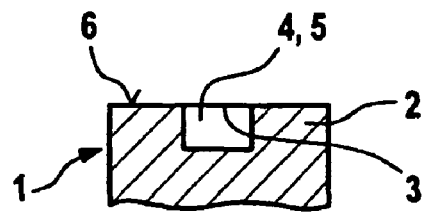
FIGS. 3a to c show various method steps involved in closing off a recess in a workpiece using a soldering foil, and FIGS. 4a, b show complete filling of a recess.
Figure 3B:
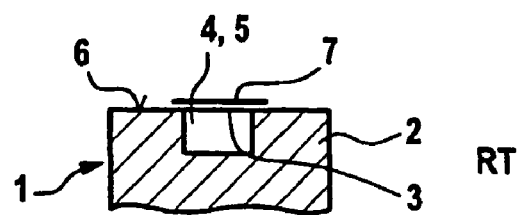
Figure 3C:
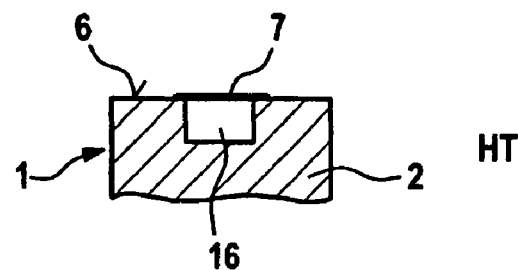

FIGS. 3a to c illustrate method steps involved in the production of a workpiece 1 with a closed recess 4, 5, 13.

FIG. 3a shows a workpiece 1 having, for example, a blind bore 5. A correspondingly stamped-out or cut-out soldering foil 7 is laid onto the blind bore 5 at room temperature RT, as illustrated in FIG. 3b. The workpiece 1 with the soldering foil 7 laid onto it, in order to subject the base material of the base body 2 or of the workpiece 1, to, for example, a precipitation hardening treatment, is exposed to a heat treatment at elevated temperatures (HT), in the course of which the soldering foil is joined to the workpiece 1 so that a cavity 16 which is closed off with respect to the outside is formed beneath the soldering foil 7.

It is not necessarily the case that the entire workpiece 1 with the soldering foil 7 has to be subjected to a heat treatment at elevated temperatures. By way of example, it is sufficient for the bearing region 8 of the soldering foils 7, which rests on the surface 6 (FIG. 1b), to be heated, for example by a laser treatment or other energy-introducing methods, in such a way that soldering takes place in this region between soldering foil 7 and surface 6.

The composition of the soldering foil 7 consists, for example, of the base material of the workpiece 1 and a solder material, which can be matched to the prevailing operating conditions, such as for example in the high-temperature range, corrosive and/or erosive environment, of the workpiece 1. The composition and dimensions of the soldering foil, which consists, for example, of pressed, fine-particle material, are selected in such a way that they are also able to withstand the mechanical loads which occur in use. The soldering foil contains a high proportion of the base material, which does not melt under the soldering conditions, or of another, correspondingly high-melting material, and a small proportion of melting solder material. The proportion by volume of the material which does not melt exceeds the proportion by volume of the melting soldering material and is expediently over 60%, and in particular is 70%. Greater proportions are also possible, for example 80% or 90%. This composition and the temperature (soldering temperature) at which soldering is carried out are selected in such a way that the solder just melts and ensures a good join between soldering foil 7 and workpiece 1. Melting of the solder material causes the individual grains of the pressed, non-melting powder of the soldering foil 7 to be joined together. On account of the added non-melting material, the soldering foil 7 is still so viscous at the soldering temperature, i.e. has such a high viscosity, that there is little if any sinking of this material into the recess 4, 5, 13. However, the soldering foil 7 does not necessarily have to contain a proportion of the base material of the workpiece 1. The high proportion of non-melting material, with the remainder melting solder, in the soldering foil 7 in particular prevents the formation of cracks.

Figure 4A:
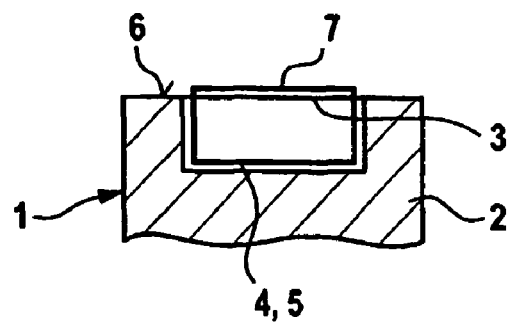

FIGS. 4a, b show a workpiece 1 in which a blind bore 5 is completely filled by a soldering foil 7.

Figure 4B:
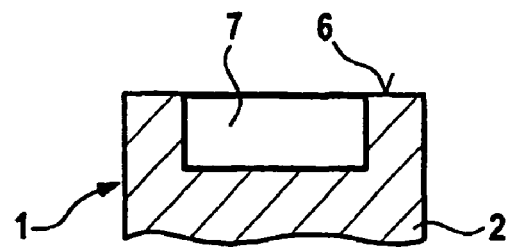

In this case, a soldering foil 7 is, for example, placed in an approximately tight-fitting manner into the blind bore 5, i.e. its dimensions in cross section correspond to the blind bore 5. The height of the soldering foil 7 is such that, after at least partial melting in the edge region of the soldering foil 7, there is as far as possible no material projecting at the surface 6 (FIG. 4b).

However, the soldering foil 7 does not necessarily have to be placed into the recess 4, 5. It is merely necessary for the mass of soldering foil 7 to be such that the melted soldering foil 7 penetrates into and fills the recess 4, 5. In this case, the composition of the soldering foil 7 comprising base material and solder material, and its resultant viscosity at the soldering temperature, are selected in such a way that the solder material and the base material can penetrate into the recess 4 and completely fill it.

The advantage of the soldering foil 7 is that the soldering foil 7 has a very high density compared to a paste or a bed of powder and the mass introduced can be measured very accurately by selection of the size of the soldering foil 7, and consequently the shrinkage is minimal and the formation of cracks is reproducibly prevented or at least reduced.

The workpiece 1 is, for example, a turbine blade or vane, consisting, for example, of a nickel-base superalloy.

By way of example after its production or during refurbishment (restoration of a used workpiece), the workpiece 1 has to be subjected to particular heat treatments in order to attain certain materials properties.

If the entire workpiece 1 is heated together with the soldering foil 7 during a heat treatment of this type, in order to externally close off the recess 4 or to completely fill it with a solder material, the composition of the soldering foil 7 can be selected in such a way that during this heat treatment, which is intended, for example, to effect solution annealing or precipitation hardening of the workpiece 1, the solder material is also melted, and consequently there is no need for a separate thermal method step for soldering purposes during production of the workpiece 1.

The invention claimed is:

1. A turbine component, comprising:
   a base body comprising a nickel base super alloy base material;
   a blind hole or through hole in the base body; and
   a soldering foil including a solder material that covers the blind hole or through hole and is soldered to the base body;
   wherein the soldering foil comprises a pressed powder mixture of two different powders, where the first powder comprises the nickel base super alloy base material that does not melt at a soldering temperature and the second powder comprises the solder material which does melt at the soldering temperature.

2. The turbine component as claimed in claim 1, wherein the cover of the blind hole or through hole completely covers the blind hole or through hole.

3. The turbine component as claimed in claim 1, wherein the turbine component is a turbine blade or vane.

4. The turbine component as claimed in claim 1, wherein the turbine component is used in high-temperature applications.

5. The turbine component as claimed in claim 1, wherein the turbine component is used in corrosive and/or erosive environments.

6. The turbine component as claimed in claim 1, wherein the proportion by volume of the non-melting material exceeds the proportion by volume of the solder material.

7. The turbine component as claimed in claim 1, wherein the proportion by volume of the non-melting material is about 70% of the total volume of the soldering foil mixture.

8. The turbine component as claimed in claim 1, wherein the soldering foil has a thickness up to four millimeters.

9. The turbine component as claimed in claim 1, wherein the soldering foil completely fills the blind hole or through hole.

10. The turbine component as claimed in claim 1, wherein the blind hole or through hole in the region close to the surface has an encircling shoulder-like cross-sectional depression, and the soldering foil at least partially rests on a base of the cross-sectional depression.

11. A turbine component comprising:
   a super alloy material base body comprising at least one hole, the super alloy material processed at a heat treatment temperature; and
   a pressed powder soldering foil arranged over the at least one hole and soldered to the base body such that the hole is effectively sealed-off by the foil,
   wherein the soldering foil comprises a pressed powder mixture of the superalloy material and a solder material powder, the solder material powder exhibiting a melting temperature below the heat treatment temperature, such that the foil is soldered to the base body during heat treatment of the base body without a separate soldering step.

* * * * *